(12) United States Patent
Koo et al.

(10) Patent No.: US 7,489,340 B2
(45) Date of Patent: Feb. 10, 2009

(54) OPTICAL IMAGE STABILIZER FOR CAMERA LENS ASSEMBLY

(75) Inventors: Jun-Mo Koo, Suwon-si (KR); Myoung-Won Kim, Seongnam-si (KR); Byung-Kwon Kang, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 698 days.

(21) Appl. No.: 11/076,382

(22) Filed: Mar. 9, 2005

(65) Prior Publication Data

US 2006/0092514 A1    May 4, 2006

(30) Foreign Application Priority Data

Nov. 4, 2004    (KR)    ............. 10-2004-0089171

(51) Int. Cl.
*H04N 5/228* (2006.01)
(52) U.S. Cl. ............................. 348/208.7; 348/374
(58) Field of Classification Search ............ 348/208.99, 348/208.4, 208.7, 218.1, 373–376, 208.11
See application file for complete search history.

(56) References Cited

U.S. PATENT DOCUMENTS

| | | | | |
|---|---|---|---|---|
| 5,460,341 A | * | 10/1995 | Katsuyama et al. | ...... 244/118.1 |
| 6,473,122 B1 | * | 10/2002 | Kanekal | ............. 348/340 |
| 2003/0141453 A1 | * | 7/2003 | Reed et al. | ............ 250/338.1 |
| 2006/0110108 A1 | * | 5/2006 | Hsieh et al. | ................ 385/92 |

FOREIGN PATENT DOCUMENTS

| | | |
|---|---|---|
| JP | 63-217778 | 9/1988 |
| JP | 2002-148007 | 5/2002 |
| WO | WO 2004020329 A1 * | 3/2004 |

* cited by examiner

*Primary Examiner*—Timothy J Henn
(74) *Attorney, Agent, or Firm*—Cha & Reiter, LLC

(57) ABSTRACT

Disclosed is an optical image stabilizer for use with a camera lens assembly. The optical image stabilizer including a fixable substrate; a movable substrate movably disposed on the fixable substrate, a fixable comb structure fixed on the fixable substrate and disposed on the movable substrate, and a movable comb structure disposed on the movable substrate and capable of moving on the fixable substrate with the movable substrate, wherein the movable substrate is moved by an attraction force acting between the fixable comb structure and the movable comb structure, when an electromotive force is applied to the fixable comb structure and the movable comb structure. In the optical image stabilizer, the movable substrate on which an image sensor is disposed and the elements for moving the movable substrate are manufactured using MEMS technology, thereby facilitating downsizing of optical image stabilizers and improving the precision of products.

22 Claims, 6 Drawing Sheets

B-B'

OPTICAL IMAGE STABILIZER FOR CAMERA LENS ASSEMBLY

CLAIM OF PRIORITY

This application claims priority to an application entitled "Optical Image Stabilizer for Camera Lens Assembly," filed in the Korean Intellectual Property Office on Nov. 4, 2004 and assigned Serial No. 2004-89171, the contents of which are hereby incorporated by reference.

BACKGROUND OF THE INVENTION

1. Field of the Invention

The present invention relates to a camera device, and more particularly to an optical image stabilizer for a camera lens assembly.

2. Description of the Related Art

Generally, charge coupled device (CCD) sensors and complementary metal oxide semiconductor (CMOS) sensor are kinds of two-dimensional sensors for photographing dynamic and static images. They play a key role in constructing electronic cameras. Particularly, CCD sensors provide excellent characteristics compared to CMOS sensors in terms of image quality. However, CCD sensors have high power consumption and complicated structures. Thus, the market demand for CMOS image sensors has increased. Recently, many attempts have been made to improve image quality of CMOS sensors. As such image sensors are developed, use of digital cameras is generalized. For example, development in image sensors resulted in the production of portable terminals such as cellular phones equipped with camera devices.

Unstable images are frequently photographed with general cameras for photographing static and moving images using such image sensors, due to the trembling of cameras. For example, the trembling is the result from external causes, such as the user's trembling hands and mounting of cameras on vehicles. In order to solve the problem of unstable images, optical image stabilizers have been suggested. Such optical image stabilizers include a movement detector portion and a movement compensator portion.

For the movement detector, a method for predicting movements of a device by a Gyro Sensor, etc., as well as a method for detecting a moved portion of an image every frame by processing image signals is used. Additionally, it is possible to solve the problem of unstable images. Clear images is obtain using the movement-related information detected as described above. A refraction lens (active prism) is used, it optionally refracts the incident light or controls the input position of an image sensor.

U.S. Pat. No. 5,398,132 (published on Mar. 14, 1995) discloses an optical image stabilizer. A lens is driven using a voice coil motor to solve the problem of unstable images resulting from movements of a camera. Such an optical image stabilizer includes a pitch coil and a pitch yoke disposed on one side of a compensator lens for driving the compensator lens in one direction as well as a yaw coil and a yaw yoke disposed on the other side of the compensator lens for driving the compensator lens in another direction perpendicular to the first direction. Briefly, in such an optical image stabilizer the compensator lens is moved according to movements of a camera so as to return an optical axis to its original position, thereby stabilizing images.

Recently, portable terminals tend to have extended functions due to a camera device mounted on portable terminals such as laptop computers and portable phones. However, conventional optical image stabilizers hinder portable terminals from being downsized and lightened.

SUMMARY OF THE INVENTION

Accordingly, the present invention has been made to solve the above-mentioned problems occurring in the prior art and provides additional advantage, by providing an optical image stabilizer for a camera lens assembly, which facilitates downsizing and lightening of the camera lens assembly.

In accordance with an aspect of the present invention, there is provided an optical image stabilizer for use with a camera lens assembly, including: a fixable substrate; a movable substrate movably disposed on the fixable substrate; a fixable comb structure fixed on the fixable substrate and disposed on the movable substrate; and a movable comb structure disposed on the movable substrate and capable of moving on the fixable substrate with the movable substrate, wherein the movable substrate is moved by the attraction force acting between the fixable comb structure and the movable comb structure, when an electromotive force is applied to the fixable comb structure and the movable comb structure.

BRIEF DESCRIPTION OF THE DRAWINGS

The present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
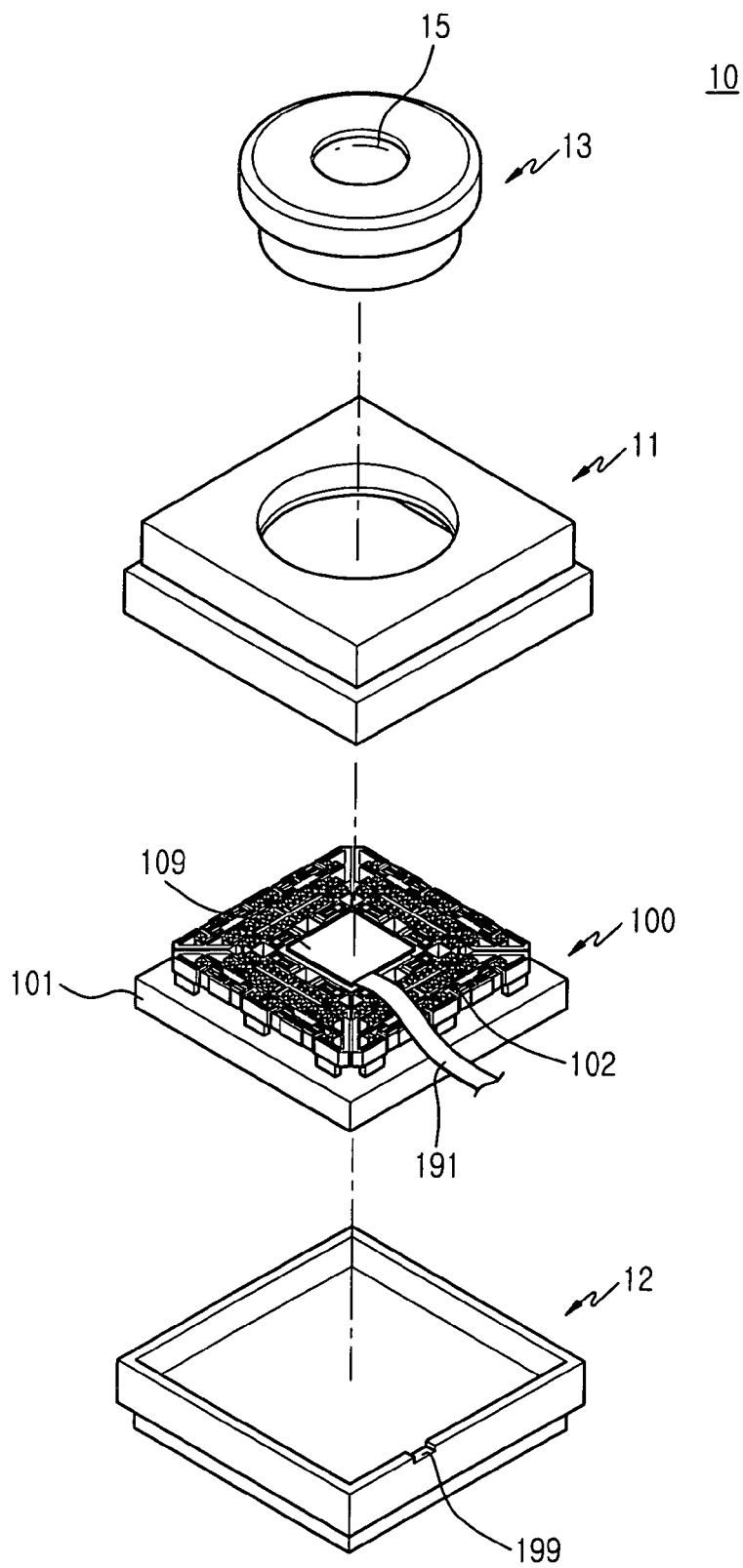
FIG. 1 is a schematic sectional view showing the structure of a camera lens assembly equipped with an optical image stabilizer according to an embodiment of the present invention.
Figure 2:
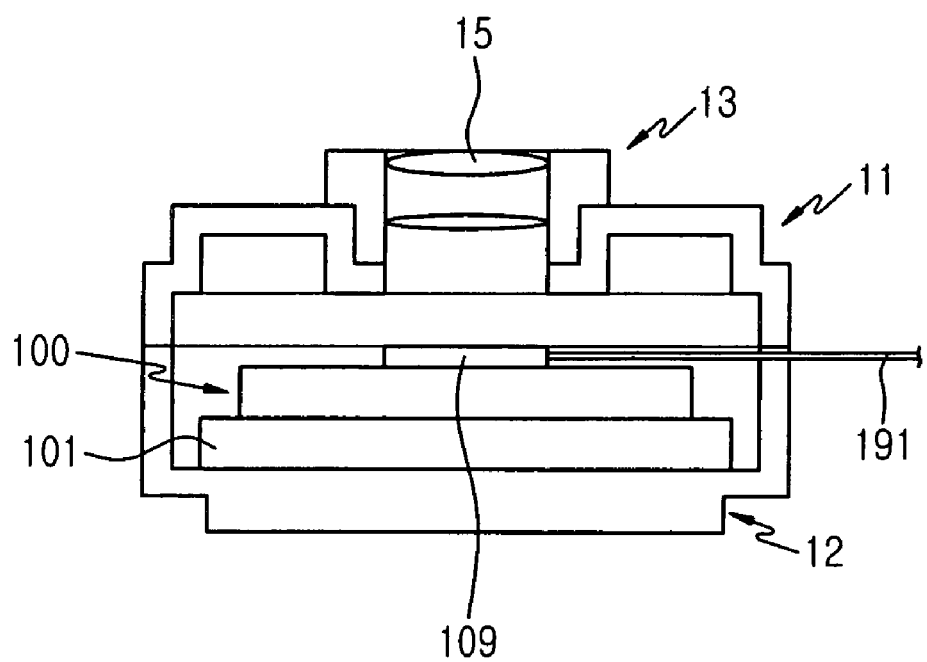
FIG. 2 is a schematic sectional view showing the optical image stabilizer included in the camera lens assembly as illustrated in FIG. 1.

FIG. 1 is schematic sectional view showing a camera lens assembly 10 equipped with an optical image stabilizer 100 according to a preferred embodiment of the present invention. FIG. 2 is a sectional view showing the structure of the camera lens assembly 10 as illustrated in FIG. 1.

As shown in FIGS. 1 and 2, the optical image stabilizer 100 according to a preferred embodiment of the present invention is contained in a lens housing including an upper housing 11 and a lower housing 12. Additionally, a lens assembly 13 having at least one lens 15 is coupled to the upper housing 11.

An image sensor such as a CCD sensor or CMOS sensor is mounted on the optical image stabilizer 100. A flexible printed circuit 191 extending from the image sensor is drawn out from the lens housing through a wiring groove 199 formed on the lower housing 12.

Figure 3:
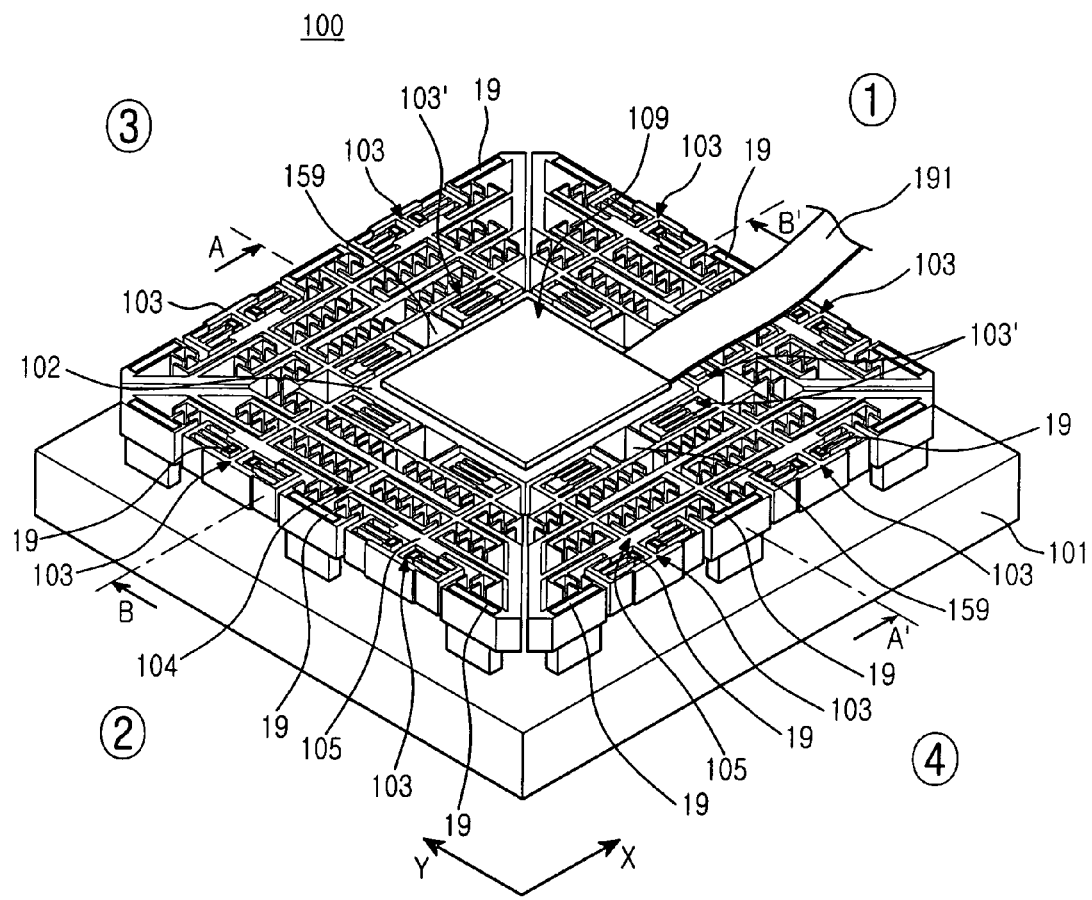
FIG. 3 is a perspective view showing the optical image stabilizer as illustrated in FIG. 2.
Figure 4:
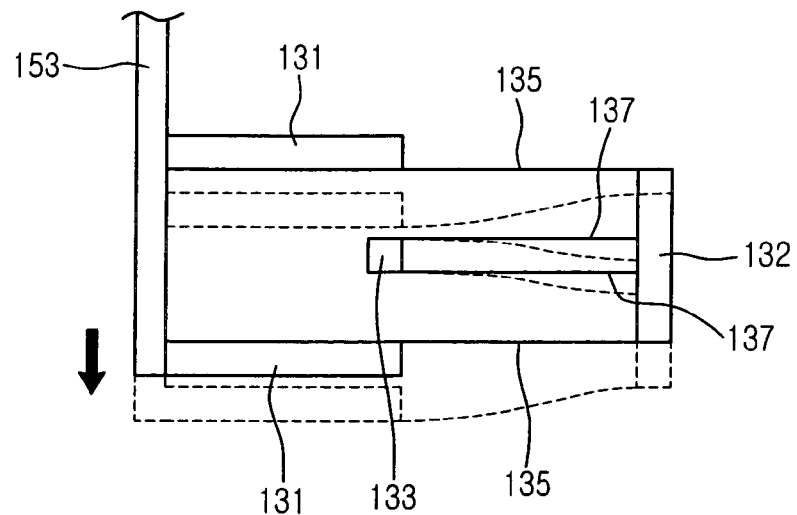
FIG. 4 is a plan view showing the elastic portion of the optical image stabilizer as illustrated in FIG. 3.

FIG. 3 is a perspective view showing the optical image stabilizer 100 of the camera lens assembly 10 according to a preferred embodiment of the present invention. FIG. 4 is a plan view showing the structure of the elastic portion 103 of the optical image stabilizer 100 as illustrated in FIG. 3.

As shown in FIGS. 3 and 4, the optical image stabilizer 100 of the camera lens assembly 10 includes a fixable substrate 101, a movable substrate 102 capable of moving on the fixable substrate 101 and comb structures 104, 105 disposed at the circumference of the movable substrate 102. The movable substrate 102 is moved by the attraction force caused by an electromotive force, for example a voltage difference, when an electric voltage is applied to the comb structures 104, 105. When the electric voltage supplied to the comb structures 104, 105 is interrupted, the elastic portion 103 causes the movable substrate 102 to be returned to its initial position. This can be accomplished by elastic pieces 135, 137 formed in the elastic portion 103. Additionally, an image sensor 109 is mounted on the movable substrate 102.

Figure 8:
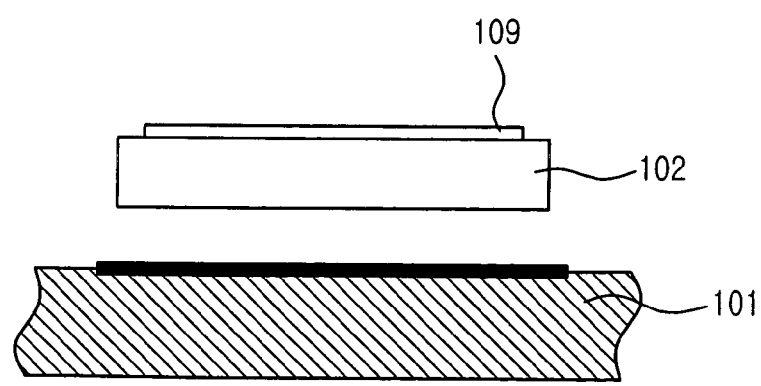
FIG. 8 is a sectional view showing the fixable substrate and the movable substrate, when taken along line A-A' in FIG. 3.

Referring to FIGS. 3 and 8, the movable substrate 102 has the image sensor 109 on a surface thereof (e.g. top surface) and is spaced apart from the fixable substrate 101. Therefore, when the attraction force is generated from the comb structures 104, 105 disposed at the circumference of the movable substrate 102, the movable substrate 102 can move on the fixable substrate 101.

The comb structures 104, 105 are disposed in such a manner that they surround the circumference of the movable substrate 102 in all directions. The comb structures 104, 105 include a fixable comb structure 104 fixed to the fixable substrate 101 and a movable comb structure 105 capable of moving on the fixable substrate 101 along with the movable substrate 102. As used herein, comb structures 104, 105 disposed on both sides ①, ② of the movable substrate 102 are referred to as a first fixable comb structure and a first movable comb structure, respectively. Comb structures 104, 105 disposed on both ends ③, ④ of the movable substrate 102 are referred to as a second fixable comb structure and a second movable comb structure, respectively.

The fixable comb structure 104 is disposed to surround the circumference of the movable substrate 102, while being fixed to the fixable substrate 101. The movable comb structure 105 is formed along the space present in the gaps of the fixable comb structure 104. Additionally, the movable comb structure 105 is disposed to surround the movable substrate 102 so that it can move on the fixable substrate 101 along with the movable substrate 102. One end of the movable comb structure 105 is fixed to edges of the movable substrate 102, while the other end is fixed on the fixable substrate 101 through a desired elastic portion 103. Elastic deformation of the elastic portion 103 permits the movable comb structure 105 to move. In addition, it provides an elastic restoring force by which the elastic portion 103 can be returned to its original position, when the voltage supply is interrupted after the movement of the movable comb structure 105.

As shown in FIG. 3, the comb structures 104, 105 have a particular pattern, for example, a complicated maze shape. This pattern is obtained by micro-machining technology, which is a method for integration of micro-devices. The micro-machining technology is a kind of semiconductor processing technology and belongs to the technology frequently referred to as micro electro mechanical systems (MEMS). With regard to MEMS, subminiature sensors or actuators and electromechanical structures with a size expressed in micrometers are manufactured by using the micro-machining technology to which the integrated circuit technology is applied. Micro-machines manufactured by the micro-machining technology can provide a sub-millimeter size and a sub-micrometer precision.

The micro-machining technology has a number of advantages. For example, it can perform ultrahigh-precision fine processing to permit downsizing, upgrading, multi-functionalization and integration of devices and to improve stability and reliability of devices. Additionally, it is possible to realize a united integrated system and to manufacture devices through an integral process. Thus, it avoids an additional assembling step and permits mass production at a low cost. The micro-machining technology is not an essential constitutional element of the optical image stabilizer according to a preferred embodiment of the present invention but merely a technical means for manufacturing the optical image stabilizer. Therefore, more detailed description with regard to the micro-machining technology will be omitted herein.

The movable substrate 102, the fixable comb structure 104 and the movable comb structure 105 are manufactured by the MEMS technology at the same time. In other words, a layered structure laminated on the fixable substrate 101 is etched by means of the MEMS technology to manufacture the movable substrate 102, the fixable substrate 104 and the movable comb structure 105 at the same time. In order to apply the MEMS technology, the fixable substrate 101 is formed of a glass substrate, and the layered structure for manufacturing the movable substrate 102, the fixable comb structure 104 and the movable comb structure 105 is preferably formed of a silicon (Si) film.

Figure 6:
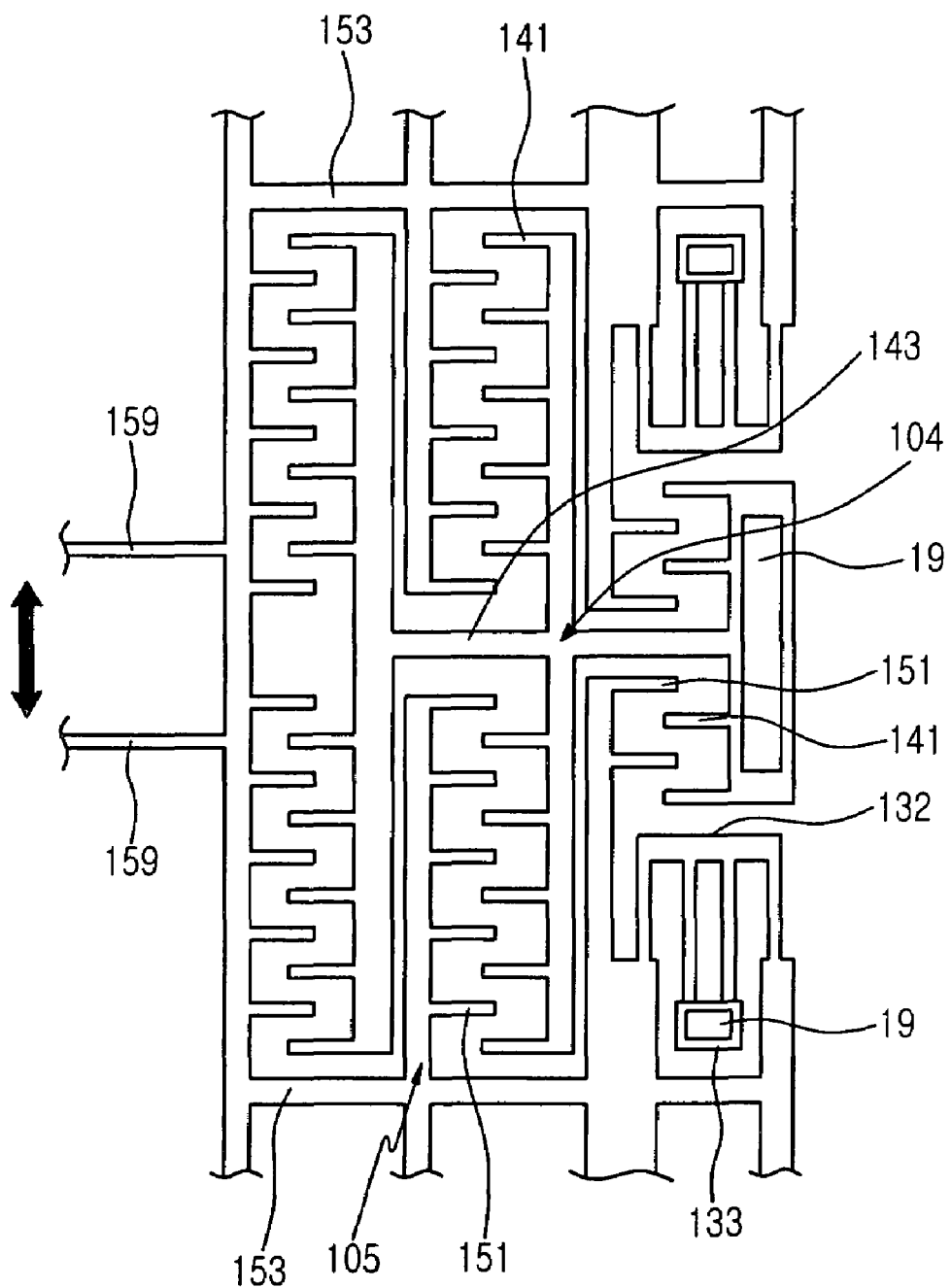
FIG. 6 is a schematic view showing the structure of comb structures of the optical image stabilizer as illustrated in FIG. 3.

Hereinafter, the structure of the fixable comb structure 104 and the movable comb structure 105 will be explained in detail with reference to FIG. 6. FIG. 6 is a schematic view illustrating the structures of the first fixable comb structure and the first movable comb structure of the optical image stabilizer 100. The second fixable comb structure and the second movable comb structure have a similar structure as the first fixable comb structure and the first movable comb structure, respectively, except for their orientation. Therefore, the second fixable and movable comb structures are neither shown in figures nor numbered with drawing numerals.

The fixable comb structure 104 includes a plurality of fixable ribs 141 and a plurality of first connection ribs 143. The first connection ribs 143 connect the fixable ribs 141 among themselves in the form of a tree.

The first fixable ribs 141 forming the first fixable comb structure extend in one direction X and are aligned in another direction Y perpendicular to the first direction X. Each of the first fixable ribs 141 is connected to another first fixable rib by means of the first connection ribs 143. Each end of the first connection ribs 143 is adjacent to the edges of the fixable substrate 101. Additionally, an electrode 19 for applying an electric voltage to the first fixable comb structure is disposed on a surface (e.g. top surface) of the end of the first connection rib 143.

The second fixable comb structure has a similar structure as the first fixable comb structure, except that the second fixable ribs extend in the second direction Y and are aligned in the first direction X. Additionally, the first fixable comb structure and the second fixable comb structure have the same structural characteristics in that the second fixable ribs are connected among themselves by the first connection ribs 143 and that the electrode 19 mounted on the end of the first connection rib 143 applies an electric voltage to the second fixable comb structure.

The movable comb structure 105 includes a plurality of movable ribs 151 and a plurality of second connection ribs 153. the second connection ribs 153 connect the movable ribs 151 among themselves in the form of a tree.

The first movable ribs 151 forming the first movable comb structure extend in the first direction X and are aligned in the second direction Y perpendicular to the first direction X. The first movable ribs 151 are connected among themselves by the second connection ribs 153. Particularly, each of the first movable ribs 151 is disposed in the gap between two successive first fixable ribs 141. In other words, the first fixable ribs 141 and the first movable ribs are disposed alternately along the second direction Y.

Each end of the second connection rib 153 is fixed at a position adjacent to the edges of the fixable substrate 101 by means of the elastic portion 103 having restoring force. Additionally, an electrode 19 for applying an electric voltage to the first movable comb structure is disposed on the top surface of the end of the second connection rib 153.

The second movable comb structure has a similar structure as the first movable comb structure, except that the second movable ribs extend in the second direction Y and are aligned in the first direction X. Additionally, the first movable comb structure and the second movable comb structure have similar structural characteristics. The second movable ribs are connected among themselves by the second connection ribs 153 and the electrode mounted on the end of the second connection rib 153 applies an electric voltage to the second movable comb structure. Further, the second movable ribs have a similar structural characteristics as the first movable ribs 151 in that each of the second movable ribs is disposed in the gap between two successive second fixable ribs.

Figure 7:
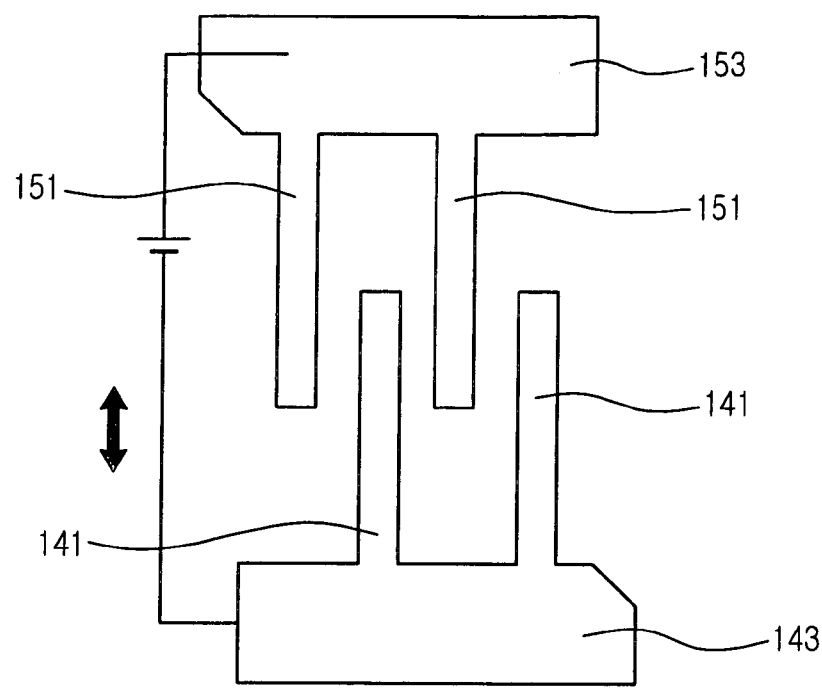
FIG. 7 is a schematic view showing the operation of the comb structures of the optical image stabilizer as illustrated in FIG. 3.

Referring to FIG. 7, when an electric voltage is applied to each electrode, the above-described comb structures 104, 105 generate an attraction force between the first connection ribs 143 and the second connection ribs facing to the first connection ribs 143. Such attraction force causes the movable comb structure to move, resulting in the movement of the movable substrate 102.

When an electric voltage is applied to the first fixable comb structure and the first movable comb structure disposed at side ①, the movable substrate 102 moves in the first direction X. When an electric voltage is applied to the second fixable comb structure and the second movable comb structure disposed at side ③, the movable substrate 102 moves in the second direction Y. When the voltage supply to side ① or ③ is interrupted, the movable substrate 102 returns to its initial position by means of the restoring force of the elastic portion 103. Similarly, when an electric voltage is applied to the first fixable comb structure and the first movable comb structure disposed at side ②, the movable substrate 102 moves in the reverse X (i.e. −X direction). Additionally, when an electric voltage is applied to the second fixable comb structure and the second movable comb structure disposed at side ④, the movable substrate 102 moves in the reverse Y (i.e. −Y direction).

As a result, the optical image stabilizer 100 can perform image stabilization by applying an electric voltage in the direction along which the movable substrate 102 is to be moved. Additionally, when the voltage supply is interrupted, the movable substrate 102 can return its initial position by the restoring force of the elastic portion 103.

Figure 5:
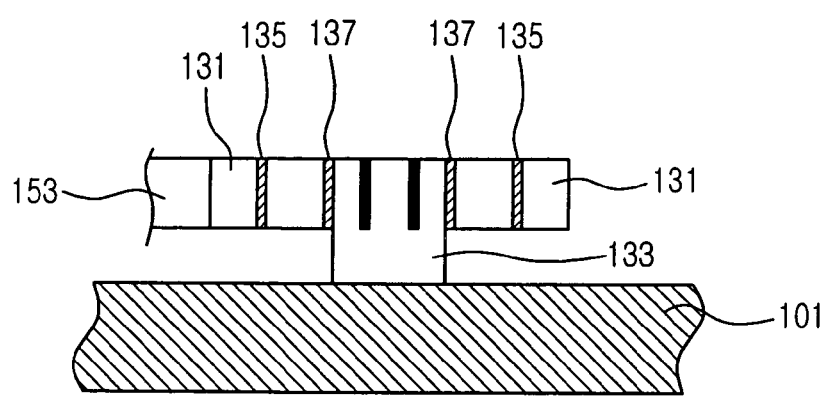
FIG. 5 is a sectional view showing the elastic portion of the optical image stabilizer, when taken along line B-B' in FIG. 3.

Referring to FIGS. 4 and 5, the elastic portion 103 is mounted at each end of the second connection rib 153 and is disposed in the vicinity of the edge of the fixable substrate 101. The elastic portion 103 includes a first connection end 131 formed at the end of the second connection rib 153, a second connection end 132 spaced apart from the first connection end 131 and facing thereto, and a fixed end 133 disposed between the first connection end 131 and the second connection end 132 and fixed on the fixable substrate 101. The first connection end 131 and the second connection end 132 are spaced apart from the fixable substrate 101 and are capable of moving on the fixable substrate 101. The electrode 19 provided on the end of the second connection rib 153 is mounted on the top surface of the fixed end 133.

The first connection end 131 and the second connection end 132 are linked to each other by the first elastic piece 135. The second connection end 132 and the fixed end 133 are linked to each other by the second elastic piece 137. The first and the second elastic pieces 135, 137 can provide the restoring force by which the movable substrate 102 is returned to its original position after the movement of the movable comb structure.

Particularly, a pair of the first elastic piece 135 and the second elastic piece 137 face another pair, while the second elastic pieces 137 are disposed between the first elastic pieces 135.

The elastic portion 103 is formed integrally with the movable comb structure by the MEMS technology.

Each of the elastic portions 103 disposed at both sides ①, ② of the movable substrate 102 provides the elastic restoring force by which the movable substrate 102 is returned to its original position when it moves in the first direction X or the reverse X (i.e. −X direction). Similarly, each of the elastic portions 103 disposed at both ends ③, ④ of the movable substrate 102 provides the elastic restoring force by which the movable substrate 102 is returned to its original position when it moves in the second direction Y or the reverse Y (i.e., −Y direction).

The elastic portion 103 has the structure described above may be disposed at one end of the second connection rib 153 (at a position adjacent to the movable substrate 102). This may be useful in improving the structural stability of the movable comb structure 105 as well as the reliability of the optical image stabilizer 100. The elastic portion 103 disposed at the position adjacent to the movable substrate 102 may have a shape slightly different from the shape of the elastic position 103 disposed at the vicinity of the edges of the fixable substrate 101.

Returning to FIG. 6, the movable comb structure 105 and the movable substrate 102 are connected to each other by a plurality of suspensions 159. The suspensions 159 includes a first suspension disposed at both sides ①, ② of the movable substrate 102 and a second suspension disposed at both ends ③, ④ of the movable substrate 102.

The first suspension transmits the movement of the first movable comb structure to the movable substrate 102. This causes the movable substrate 102 to move in the first direction X, while permitting the movable substrate 102 to move in the second direction Y or the reverse Y (i.e. −Y direction). In other words, when the movable substrate 102 moves in the second direction Y or the reverse Y (i.e. −Y direction), the first suspension experiences an elastic deformation. This prevents the movement of the movable substrate 102 in the second direction Y or the reverse Y (i.e., −Y direction) from being transmitted to the first movable comb structure.

The second suspension transmits the movement of the second movable comb structure to the movable substrate 102. This causes the movable substrate 102 to move in the second direction Y, while permitting the movable substrate 102 to move in the first direction X or the reverse X (i.e. −X direction). In other words, when the movable substrate 102 moves in the first direction X or the reverse X (i.e. −X direction), the second suspension experiences an elastic deformation, and thus prevents the movement of the movable substrate 102 in the first direction X or the reverse X (i.e., −X direction) from being transmitted to the second movable comb structure.

The optical image stabilizer having the structural characteristics described above receives control signals according to degrees and rates of the trembling of a camera. The control signals are detected by an angular velocity sensor or Gyro sensor mounted on a camera device for detecting unstable images of the camera caused by the user's trembling hands. The control signals may be an electric voltage applied to the electrodes 19. When an electric voltage is applied to the electrodes 19 of the optical image stabilizer 100 according to degrees and rates of the trembling of a camera, the electrostatic force acting between the comb structures 104, 105 causes the movement of the movable comb structure, resulting in the movement of the movable substrate 102.

As can be seen from the foregoing, an optical image stabilizer according to the present invention includes a movable substrate on which an image sensor is mounted and compensator elements for moving the movable substrate according to the trembling of a camera caused by the user's trembling hands, etc. The movable substrate and the elements are manufactured by etching a layered structure on a fixable substrate. Therefore, the optical image stabilizer can be easily manufactured. Further, the optical image stabilizer is manufactured using MEMS technology, thereby facilitating downsizing of optical image stabilizers and improving the precision of products. Accordingly, such a downsized camera lens assemblies can be easily mounted on notebook computers and portable terminals including cellular phones.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical image stabilizer for a camera lens assembly, comprising:
   a fixable substrate;
   a movable substrate movably disposed on the fixable substrate;
   a fixable comb structure fixed on the fixable substrate and disposed on the movable substrate; and
   a movable comb structure disposed on the movable substrate and capable of moving on the fixable substrate with the movable substrate, one end of the movable comb structure is fixed to at least one edge of the movable substrate and a remaining end of the movable comb structure is fixed to at least one edge of the fixable substrate;
   wherein the movable substrate is moved by an attraction force acting between the fixable comb structure and the movable comb structure, when an electromotive force is applied to the fixable comb structure and the movable comb structure so that the movable comb structure can be deformed elastically.

2. The optical image stabilizer as claimed in claim 1, wherein the electromotive force is an electric voltage.

3. The optical image stabilizer as claimed in claim 1, wherein the fixable comb structure and the movable comb structure are disposed on a circumference of the movable substrate.

4. The optical image stabilizer as claimed in claim 1, wherein the fixable substrate is a glass substrate, and the movable substrate, the fixable comb structure and the movable comb structure are formed by etching a silicon (Si) film laminated on the fixable substrate.

5. The optical image stabilizer as claimed in claim 1, wherein the remaining end of the movable comb structure is provided with an elastic restoring force.

6. The optical image stabilizer as claimed in claim 5, wherein the movable comb structure is provided with an elastic portion including a first connection end disposed at a remaining end of the movable comb structure; a second connection end facing to the first connection end; a fixed end disposed between the first connection end and the second connection end while facing to the second connection end, and fixed on the fixable substrate; a first elastic piece for connecting the first connection end with the second connection end; and a second elastic piece for connecting the second connection end with the fixed end, wherein the elastic portion imparts an elastic restoring force to the movable comb structure.

7. The optical image stabilizer as claimed in claim 6, wherein another elastic portion is further disposed at a position adjacent to the end of the movable comb structure where the movable comb structure is fixed to at least one edge of the movable substrate.

8. The optical image stabilizer as claimed in claim 1, wherein the fixable comb structure includes a first fixable comb structure disposed at each side of the movable substrate and a second fixable comb structure disposed at each end of the movable substrate.

9. The optical image stabilizer as claimed in claim 1, wherein the movable comb structure includes a first movable comb structure disposed at each side of the movable substrate and a second movable comb structure disposed at each end of the movable substrate.

10. The optical image stabilizer as claimed in claim 1, wherein the fixable comb structure includes a plurality of first fixable ribs extending in one direction and aligned in another direction perpendicular to the first direction; and a plurality of second fixable ribs extending in the second direction and aligned in the first direction.

11. The optical image stabilizer as claimed in claim 10, wherein the fixable comb structure further includes a first connection rib that connects the first fixable ribs with the second fixable ribs in the form of a tree.

12. The optical image stabilizer as claimed in claim 1, wherein the movable comb structure includes a plurality of first movable ribs extending in the first direction and aligned in the second direction perpendicular to the first direction; and a plurality of second movable ribs extending in the second direction and aligned in the first direction, the first movable ribs being disposed at each gap between two successive first fixable ribs and the second movable ribs being disposed at each gap between two successive second fixable ribs.

13. The optical image stabilizer as claimed in claim 12, wherein the movable comb structure further includes a second connection rib that connects the first movable ribs with the second movable ribs in the form of a tree.

14. The optical image stabilizer as claimed in claim 12, wherein the first movable ribs are moved when an electromotive force is applied to the first fixable ribs and the first movable ribs, resulting in movement of the movable substrate in the first direction.

15. The optical image stabilizer as claimed in claim 12, wherein the second movable ribs are moved when an electromotive force is applied to the second fixable ribs and the second movable ribs, resulting in movement of the movable substrate in the second direction.

16. The optical image stabilizer as claimed in claim 11, wherein each end of the first connection rib and the second connection rib connecting the first fixable ribs with the second fixable ribs and the first movable ribs with the second movable ribs, respectively, in the form of a tree is adjacent to the edges of the fixable substrate, and an electrode for applying an electric voltage to the fixable comb structure and the movable structure is mounted at each end of the first connection rib and the second connection rib.

17. The optical image stabilizer as claimed in claim 1, wherein an image sensor is attached on the movable substrate.

18. The optical image stabilizer as claimed in claim 5, wherein a pair of the first elastic piece and the second elastic piece faces to another pair of the first elastic piece and the second elastic piece, and the second elastic pieces are disposed between the first elastic pieces.

19. The optical image stabilizer as claimed in claim 6, wherein each of the first elastic piece and the second elastic piece is formed by etching a silicon film laminated on the fixable substrate.

20. The optical image stabilizer as claimed in claim 6, wherein an electrode for applying an electromotive force is disposed on a top surface of the fixed end of the elastic portion.

21. The optical image stabilizer as claimed in claim 1, which further including
a first suspension for connecting both sides of the movable substrate with one end of the first movable comb structure so as to transmit the movement of the first movable comb structure to the movable substrate, while permitting the movable substrate to move in a direction perpendicular to the moving direction of the first movable comb structure; and
a second suspension for connecting both ends of the movable substrate with one end of the second movable comb structure so as to transmit the movement of the second movable comb structure to the movable substrate, while permitting the movable substrate to move in a direction perpendicular to the moving direction of the second movable comb structure.

22. The optical image stabilizer as claimed in claim 21, wherein the first movable comb structure moves in the direction perpendicular to the moving direction of the second movable comb structure.

* * * * *